Patented May 14, 1940

2,200,858

UNITED STATES PATENT OFFICE 2,200,858

TREATMENT OF CACAO BUTTER

William Clayton, Sydney Back, James Frederick Morse, and Robert Ian Johnson, London, England, assignors to Crosse & Blackwell Limited, London, England, a British company No Drawing. Original application January 15, 1937, Serial No. 120,822. Divided and this application September 25, 1937, Serial No. 165,770. In Great Britain January 18, 1936

6 Claims. (Cl. 260—406)

This invention relates to methods of preparing modified glycerides suitable for use in the process of U. S. application No. 120,822, now Patent No. 2,103,612, from which this application is divided, or in the process of U. S. application No. 120,823, now Patent No. 2,097,720.

According to the invention, a suitable glyceride, containing initially a major proportion of a mono-unsaturated disaturated glyceride such as oleodistearin or oleopalmitostearin, is oxidised preferably by blowing with an oxidising gas.

The preferred raw material is cacao butter which is oxidised and preferably polymerised, but similar raw materials may be used such as "premier jus".

Example 1

448 lbs. of cacao butter are placed in a gas fired stainless steel pan, fitted with a thermostat and a stainless steel coil for blowing in air.

The temperature is raised to 250° C. and air is blown in, 1,000 to 1,500 cu. ft. per hour being employed; these conditions are maintained and the reaction products leave the pan through an exhaust duct, being discharged into the air.

Different products are obtained depending on the extent to which the treatment is carried. The following properties of the different types of modified glycerides may be used to determine at what stage the process should be stopped.

| Property | Modified glyceride A (oxidised) | Modified glyceride AB (oxidised and polymerised) | Modified glyceride B (oxidised and substantially completely polymerised) |
|---|---|---|---|
| Molecular weight | 1050–1150 | 1250–1350 | Above 1500 |
| Iodine value | 23–24 | 20–22 | 20–22 |
| Time of reaction, hours | 4–5 | 7–8 | Over 9 |

The point at which the reaction is stopped will depend on the desired properties of the product, and the values given above refer only to one range of products under certain conditions (type of pan, volume of air, temperature, catalysts, etc.) and where products of slightly different properties are required, the reaction may be stopped when the molecular weight has attained values outside those limits given above.

Where a preponderance of modified glyceride A is required in the modified glyceride AB, it is desirable to carry out the reaction in an aluminium pan and in the absence of catalysts, such as iron. If a modified glyceride B is required, a suitable iron salt (iron oleate) may be added to give an iron concentration of 50 to 60 parts per million and the presence of this amount of iron may reduce the reaction time by half.

The oxidation may be carried out by any other suitable method (e. g. acetic acid/hydrogen peroxide mixtures), the modified glyceride A thus formed being subsequently taken to any desired degree of polymerisation to give the AB or B forms. The polymerisation of the oxidised product (A or AB) may be performed by heating in absence of air, with or without agitation.

We declare that what we claim is:

1. Polymerised and strongly oxidised cacao butter having a molecular weight from 1050 to 1500 and an iodine value below 24.

2. Strongly oxidised cacao butter having a molecular weight of about 1050 to 1150 and an iodine value of about 23 to 24.

3. Polymerised and strongly oxidised cacao butter having a molecular weight of about 1250 to 1350 and an iodine value of about 20 to 22.

4. Process of producing a strongly oxidised glyceride which consists in blowing heated cacao butter with air until the molecular weight is increased above 1050 but not above 1500.

5. Process as claimed in claim 4 in which the reaction is performed in absence of catalyst.

6. Process as claimed in claim 4 in which a small proportion of an iron salt is added to increase polymerisation.

WILLIAM CLAYTON.
SYDNEY BACK.
JAMES FREDERICK MORSE.
ROBERT IAN JOHNSON.